United States Patent
Owens et al.

(10) Patent No.: US 8,689,739 B2
(45) Date of Patent: Apr. 8, 2014

(54) REPTILE VERTICAL DISPLAY

(75) Inventors: Stanley J. Owens, Oak Park, CA (US); Chad W. Robbins, Simi Valley, CA (US); Joseph M. Flora, Simi Valley, CA (US); Douglas R. Carr, Oxnard, CA (US); John Von Buelow, Oak Park, CA (US)

(73) Assignee: United Pet Group, Inc., Cincinnati, OH (US)

(*) Notice: Subject to any disclaimer, the term of this patent is extended or adjusted under 35 U.S.C. 154(b) by 162 days.

(21) Appl. No.: 12/900,302

(22) Filed: Oct. 7, 2010

(65) Prior Publication Data

US 2012/0085293 A1    Apr. 12, 2012

(51) Int. Cl.
*A01K 1/00* (2006.01)
*A01K 1/03* (2006.01)

(52) U.S. Cl.
USPC ............................ 119/455; 119/417; 119/452

(58) Field of Classification Search
USPC ......... 119/452, 455–457, 245–248, 269, 417; 47/66.6, 39, 69
See application file for complete search history.

(56) References Cited

U.S. PATENT DOCUMENTS

| | | | | |
|---|---|---|---|---|
| 2,002,380 | A | * | 5/1935 | Wernicke et al. ............ 47/69 |
| 3,774,575 | A | | 11/1973 | Patterson |
| 4,365,590 | A | * | 12/1982 | Ruggieri et al. ............ 119/418 |
| 5,010,845 | A | * | 4/1991 | Azpurua et al. ............ 119/452 |
| 5,042,425 | A | | 8/1991 | Frost, Jr. |
| 5,197,409 | A | * | 3/1993 | Hammond ............ 119/253 |
| 5,799,614 | A | | 9/1998 | Greenwood |
| 5,803,019 | A | | 9/1998 | Heilborn et al. |
| 6,029,604 | A | * | 2/2000 | de Vosjoli et al. ........... 119/246 |
| 6,810,833 | B2 | | 11/2004 | Bonner et al. |
| 6,953,266 | B1 | | 10/2005 | Ver Hage et al. |
| 7,032,540 | B2 | | 4/2006 | Bonner et al. |
| 7,237,509 | B2 | | 7/2007 | Bonner et al. |
| 7,527,022 | B2 | | 5/2009 | Bonner et al. |
| 7,703,416 | B2 | | 4/2010 | Farmer et al. |
| 2008/0087231 | A1 | * | 4/2008 | Gabriel et al. ............ 119/455 |

OTHER PUBLICATIONS

Photos of reptile habitats: Companion Reptile Habitats, Dutch (DAS) Reptilehabitats, NAP/CASCO Reptile Habitats, and Zoo Med Reptile Systems; 4 pages; date unknown.

* cited by examiner

*Primary Examiner* — Son T Nguyen
*Assistant Examiner* — Kathleen Alker
(74) *Attorney, Agent, or Firm* — Merchant & Gould P.C.

(57) ABSTRACT

The present disclosure provides a system and method for displaying animals in temperature controlled enclosures.

12 Claims, 13 Drawing Sheets (D-depth, W-width, H-height)

REPTILE VERTICAL DISPLAY

TECHNICAL FIELD

The present disclosure provides a system and method for displaying animals in temperature controlled enclosures.

BACKGROUND

A number of system and methods for displaying animals are known. For example, see U.S. Pat. Nos. 7,527,022; 7,237,509; 7,032,540; 6,953,266; 6,810,833; 5,799,614; 5,042,425 and 3,774,575. The present disclosure provides a new system and method for displaying animals, which is particularly well-suited for the display of reptiles.

SUMMARY

The present disclosure provides an enclosure system wherein animals housed therein choose to position themselves in the front area of the enclosure which provides display advantages. In addition, the system of the present disclosure is easy to operate and maintain.

DETAILED DESCRIPTION

Figure 1:
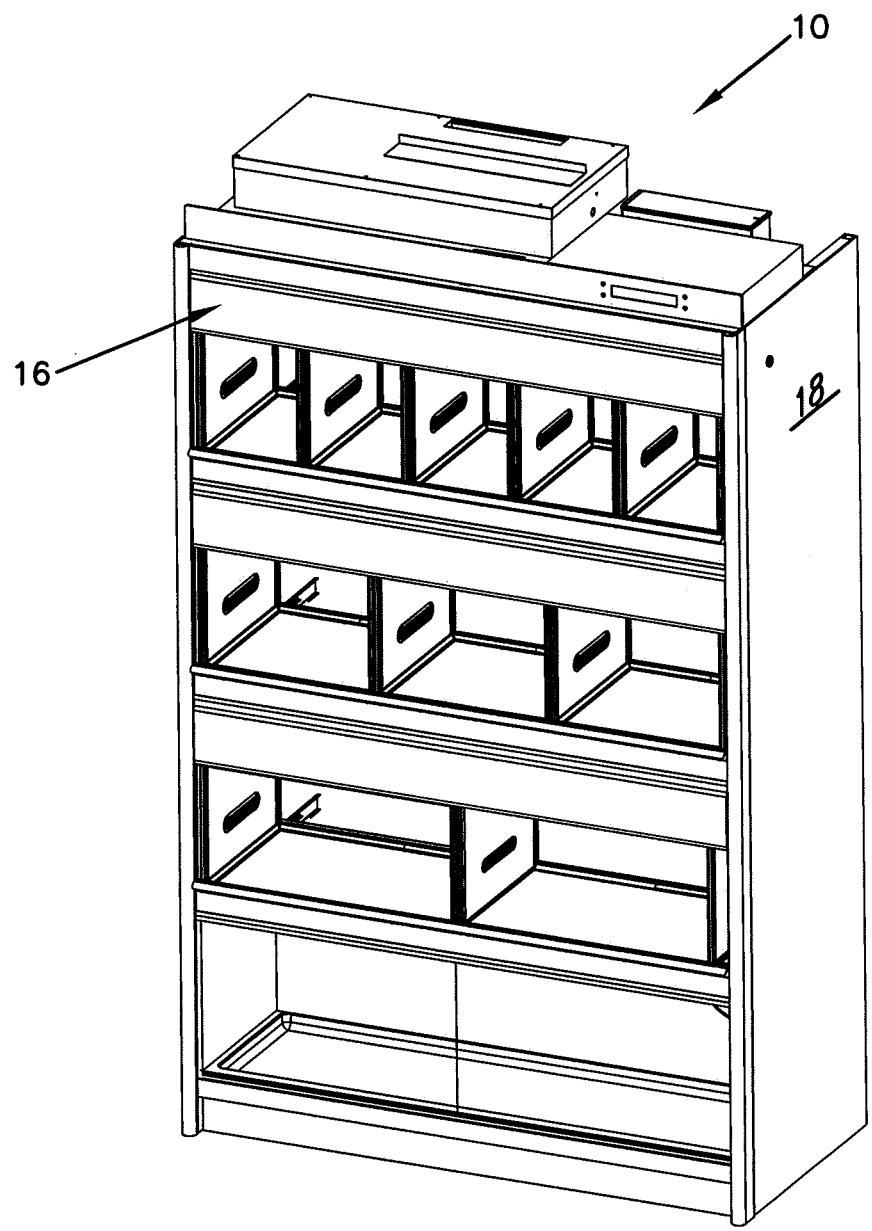
FIG. 1 is a perspective view of an enclosure system according to the principles of the present disclosure.
Figure 2:
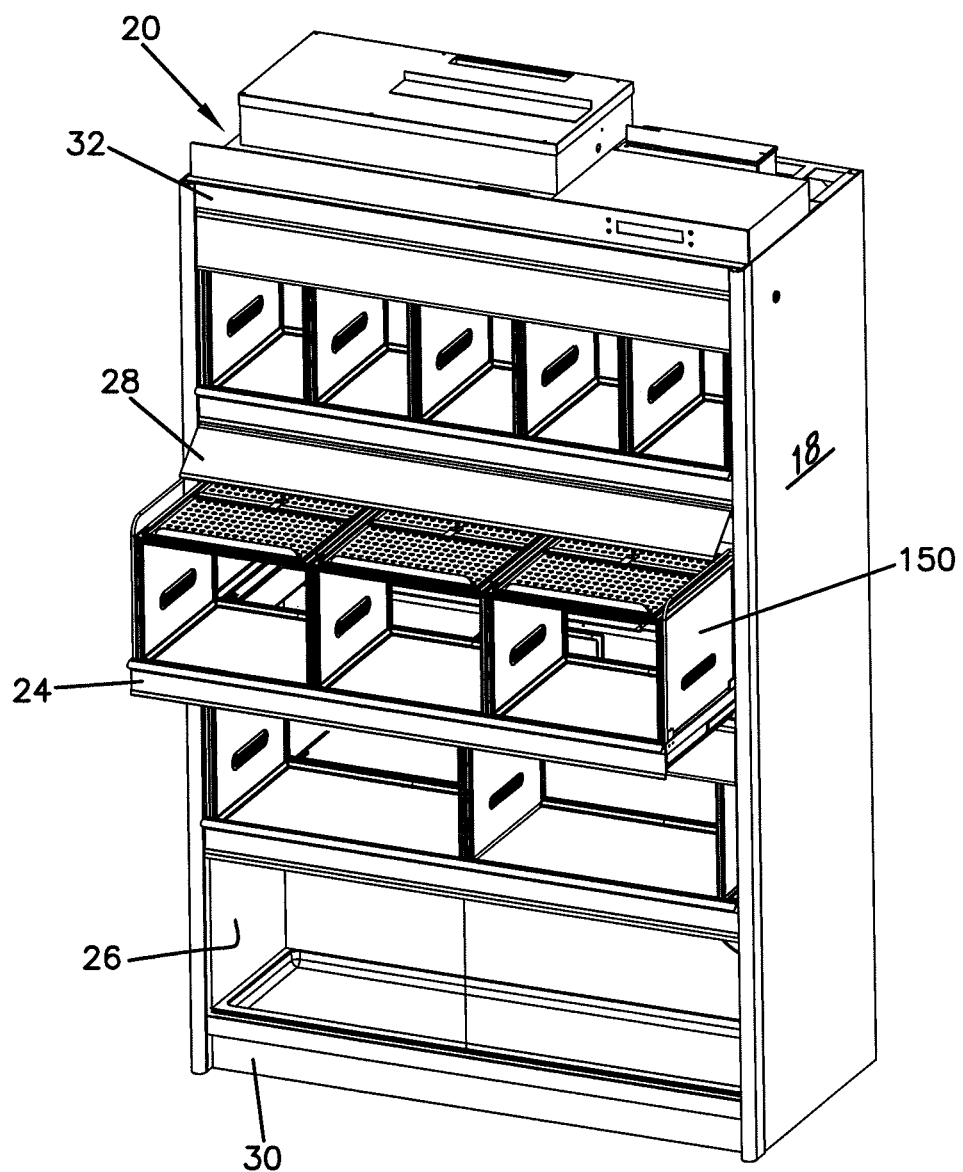
FIG. 2 is a perspective view of an enclosure system of FIG. 1 with a tray in a partially extended position.
Figure 3:
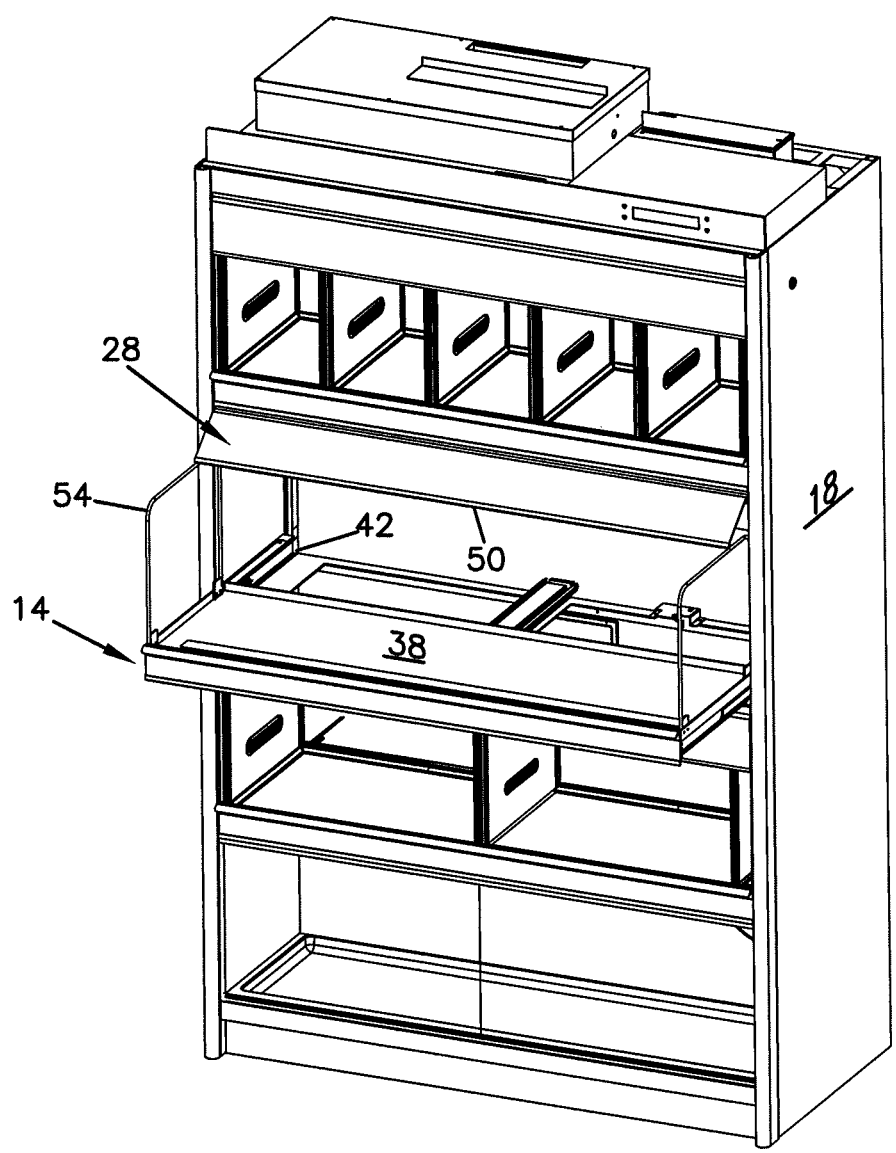
FIG. 3 is a perspective view of an enclosure system of FIG. 1 with a tray in a partially extended position without enclosures thereon.
Figure 4:
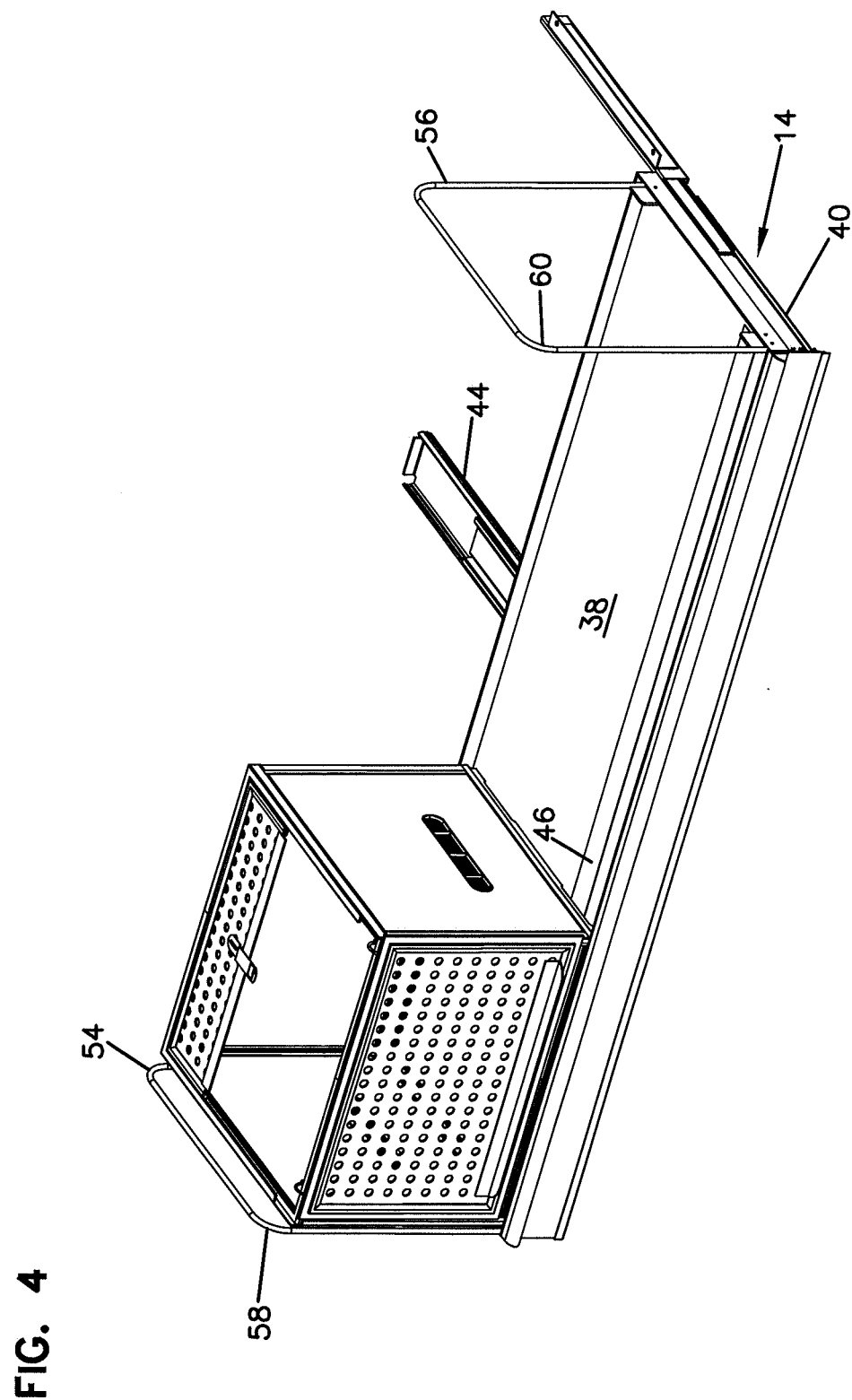
FIG. 4 is a perspective view of a tray of the enclosure system of FIG. 1 with a single enclosure thereon.

Referring generally to FIGS. 1-10, an embodiment of an enclosure system according to the present disclosure is described in greater detail. The enclosure system 10 is configured to support a number of removable enclosures 150 on trays 14 that extend and retract relative to the front plane of the enclosure system. In the depicted embodiment the enclosure system includes four spaced apart horizontally arranged trays (bottom tray, lower middle tray, upper middle tray, and top tray) that extend and retract from the frame 12.

In the depicted embodiment the bottom tray supports a single extra large size enclosure, the lower middle tray supports two large size enclosures, the upper middle tray supports three medium size enclosures, and the top tray supports five small enclosures. In the depicted embodiment the enclosures rest on the tray and can be removed from the tray by simply lifting them off the tray (i.e., in the depicted embodiment the trays are not secured to the tray with fasteners). The enclosures can be rearranged according to the preferences of the user. For example, in one embodiment a single tray may include two small enclosures and one medium size enclosure. In another configuration, the system could have five small enclosures on each tray. It should be appreciated that many other tray and enclosure configurations are possible.

In the depicted embodiment the enclosure system is configured to provide light and heat to the interior space of each of the enclosures. The sources of light and heat are provided from the exterior of the enclosures to allow the enclosures themselves to be easily removed. As discussed above, this construction enables the enclosures to be easily rearranged, and also allows the enclosures to be easily removed and cleaned.

In the depicted embodiment the enclosure system 10 includes a front plane 16, opposed side walls 18, 20 and a back wall 22. The front plane 16 comprises a plurality of tray edges 24, enclosure windows 26, light containment shields 28, and front frame panels 30, 32. The front plane 16 is configured to minimize the amount of light illuminating the inside of the enclosures from leaking out of the enclosure system from areas other than the front surface of the enclosures (otherwise referred to herein as the enclosure windows 36). In the depicted embodiment the enclosure windows 36 are transparent material (e.g., glass, polycarbonate, etc.) or semi-transparent materials (e.g., perforate aluminum) and the side walls are opaque. In the depicted embodiment the light containment shields 28 minimize light leak even when the trays are in the extended position. In the depicted embodiment light containment shields 28 are configured to prevent light from within the enclosure system from shining into the eyes of the operator as the operator pulls the tray outwardly to its extended position.

Referring to FIGS. 2-6, the trays 14 are described in greater detail. In the depicted embodiment the trays 14 define a support surface 38 that is connected to a slide assembly that slidably supports the trays 14 on the frame 12. In the depicted embodiment the slide assembly includes opposed end slide sub-assemblies 40, 42 and a center slide sub-assembly 44. The support surface 38 includes a belly heating element 46 that is positioned adjacent the front edge of the tray. In the depicted embodiment, the belly heating element 46 is configured to contact the bottom surface of the enclosure to deliver heat to the enclosure via conduction. In the depicted embodiment, the belly heating element 46 also transfers heat to the enclosure via radiation and conduction. The belly heating element in the depicted embodiment extends the length of the tray and is in the shape of a 1 inch wide strip. The belly heat element is discussed further below. It should be appreciated that many other tray configurations are possible.

Still referring to FIGS. 2-6, the light containment shields 28 are described in greater detail. In the depicted embodiment the light containment shields 28 are identical and therefore only one shield will be described in detail. The light containment shield 28 is configured to move from a first position (e.g. a vertical position) to a second position (e.g., off-set from the vertical position) automatically when the tray 14 is moved from a retracted position to an extended position. The containment shields 28 are configured to move back to the first position from the second position automatically when the tray 14 is moved from the extended position back to the retracted position. In the depicted embodiment, the movement of the light containment shield 28 is triggered as well as driven by the movement of the tray.

In the depicted embodiment the light containment shield 28 includes an upper longitudinal edge 48 and a lower longitudinal edge 50. The light containment shield 28 pivots along an axis 52 adjacent the upper longitudinal edge 48. The lower longitudinal edge 50 engages guide rails 54, 56 located at opposed ends of the trays 14. The guide rails include curved front corners 58, 60 to facilitate a smooth pivoting action of the light containment shields 28. The guide rails 54, 56 include a portion that extends slightly above the top portions of the enclosures. In the depicted embodiment the guide rails 54, 56 extend at least 0.5 inches above the top most portion of the enclosures (e.g., 1.0 inches above the top most portion of the enclosure). It should be appreciated that many other light containment configurations are possible.

Figure 5A:
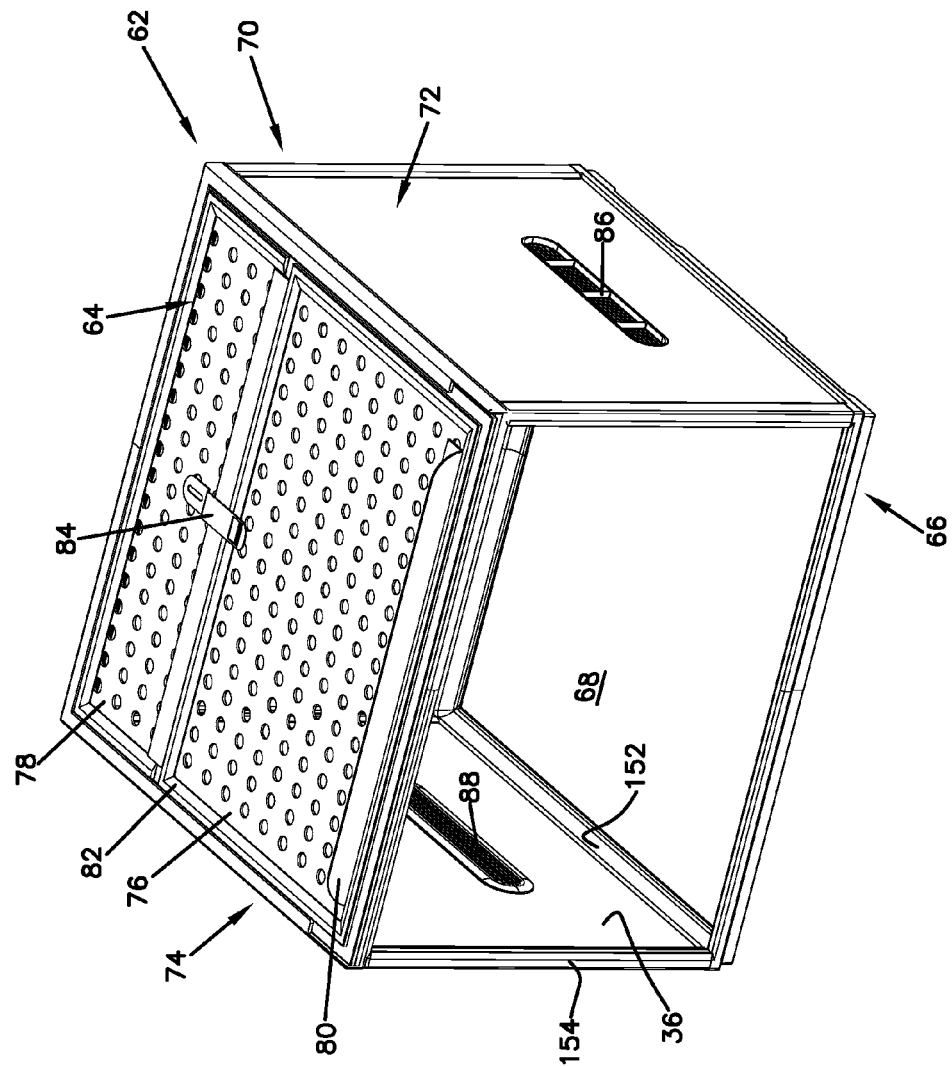
FIG. 5A is a perspective view of the enclosure of FIG. 4 with a cover in a closed position.
Figure 5B:
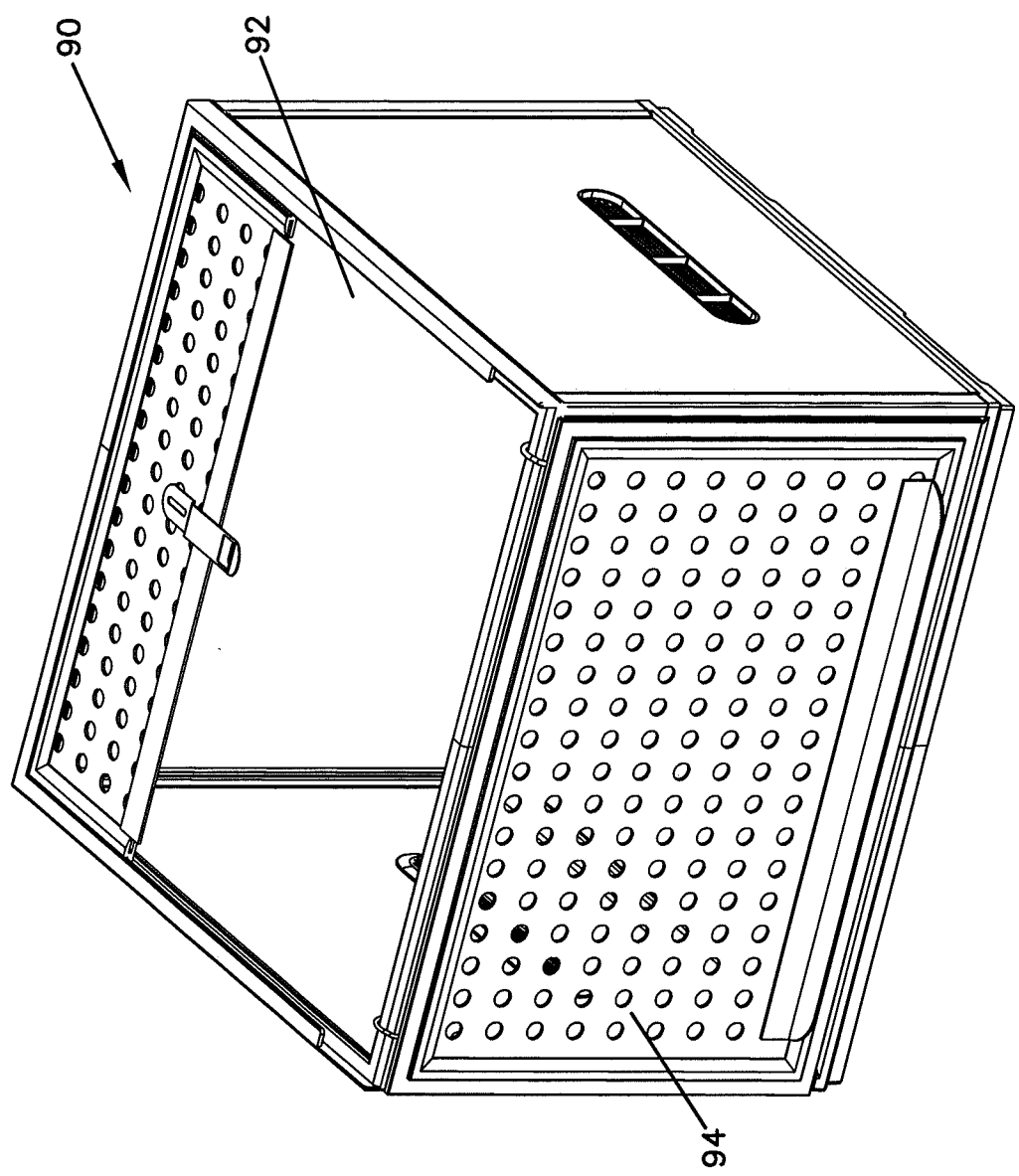
FIG. 5B is a perspective view of an alternative embodiment of the enclosure of FIG. 5A.
Figure 5D:
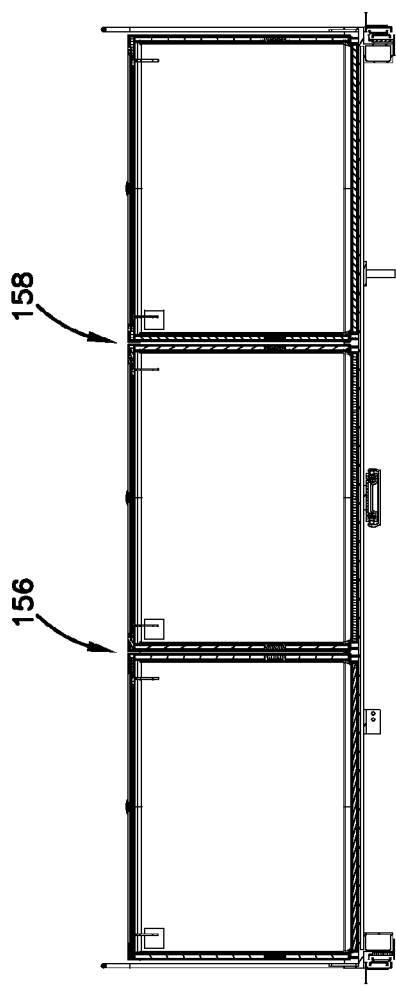
FIG. 5D is a cross-sectional view along 5D-5D of FIG. 5C.
Figure 5C:
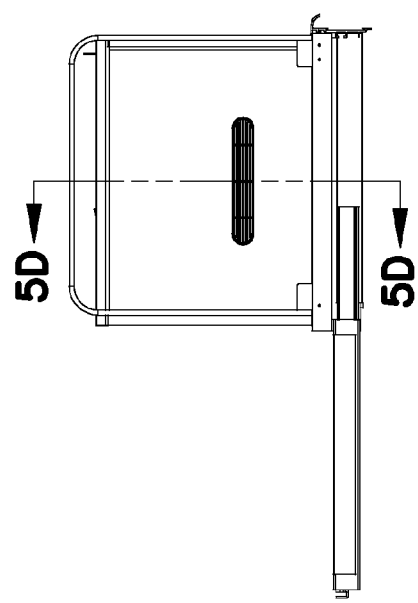
FIG. 5C is a side view of a tray with an enclosure thereon.

Referring to FIGS. 5A and 5B, the enclosures are described in greater detail. Referring to FIG. 5A, the enclosure 62 includes six sides: top 64, bottom 66, front 68, back 70, and opposite sides 72, 74. Referring to FIG. 5A, the top includes a front section 76 and a rear section 78. In the depicted embodiment both sections are perforated, and the front section 76 is removable by pulling up on the lip 80. When the front section 76 is positioned on top of the enclosure, it is retained along its rear edge 82 via a spring clip 84. As discussed above, the front 68 of the enclosure defines a window 36, which allows the animals within the enclosure to see what is outside of the enclosure, and allows people outside of the enclosure to see the animals within the enclosure. The opposed sides include flush mounted vents 86, 88, which are configured to facilitate air circulation. The air circulation system will be described in greater detail below. In an example embodiment the bottom, front, back, and side surfaces are connected together via extruded joint members 152, 154, which define radiused inner facing transition surfaces.

Referring to FIG. 5B, an alternative embodiment of the enclosure 62 is shown. In the depicted embodiment, the enclosure 90 is similar to the enclosure 62 except that the front section 92 of the top of the enclosure is fully transparent and the front of the enclosure includes a perforated door 94. In the depicted embodiment the door 94 can be easily opened to allow access into the enclosure. In this embodiment the trays do not need to be extended to access the interior of the enclosure. The door 94 can be configure to be completely detached from the enclosure 90 or, alternatively, configured to pivot or slide open. It should be appreciated that many enclosure configurations are possible.

Referring to FIGS. 6 and 8-10, the heating and illumination system is described in greater detail. For display purposes it is desirable to encourage the animals in the enclosure to bask in the front portion of the enclosure adjacent the windows 36. It is also desirable to provide a temperature gradient within the enclosure so that the animals (e.g., reptiles) can regulate their temperature by positioning themselves at different locations within the enclosure. The disclosed heating system is configured to encourage basking in the front of the tank and to create a temperature gradient within the enclosure.

In the depicted embodiment, the enclosure system includes a multiple heating subsystem that can be adjusted to result in substantially different climates even in adjacent enclosures. The average temperature in adjacent enclosures can vary by ten degrees or even more. The heating subsystem for each enclosure shares common features, which are described in greater detail below.

Figure 6:
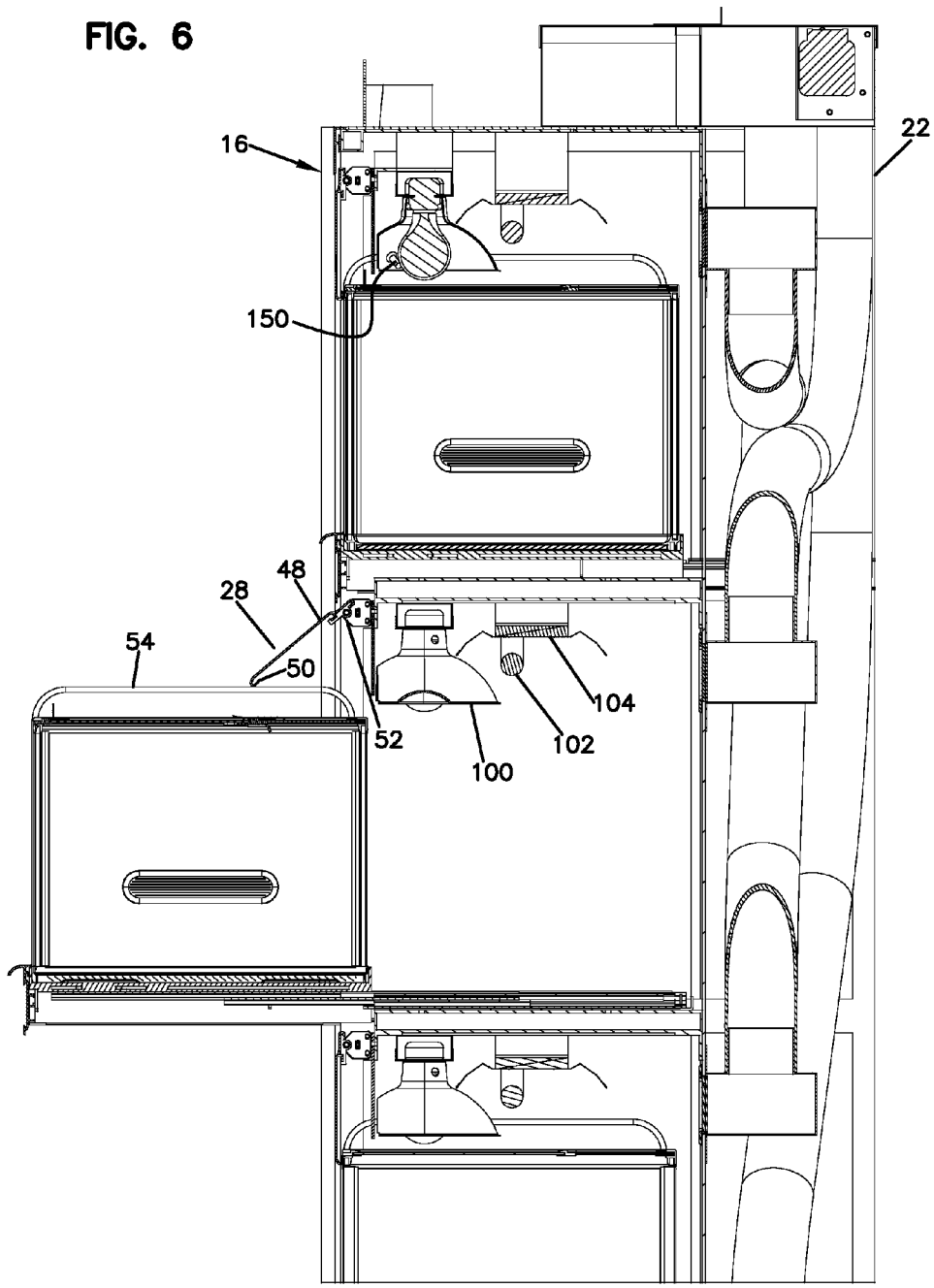
FIG. 6 is a cross-sectional view of a portion of the enclosure system of FIG. 1.

Referring to FIG. 6, the heating subsystem includes a heat lamp 100, a lighting fixture 102, and the belly heat strip 46. In the depicted embodiment the heat lamp 100 is fixed with respect to the frame 12, and the belly heat strip 46 is fixed with respect to the tray 14. When the tray 14 is fully retracted, the enclosures on the tray 14 are located within the enclosure system 10. When the tray 14 is fully retracted, the heat lamp 100 is positioned slightly above the front section 76 of the cover. In the depicted embodiment the distance between the lowest portion of the heat lamp 100 and the top of the front section 76 is less than 3.0 centimeters (e.g., between 0.5 to 1.0 centimeters).

The heat lamp 100 directs heat through the front section 76 of the cover into the front upper area of the enclosure. In the depicted embodiment the front section 76 of the cover is constructed of a perforated aluminum sheet. The front section 76 is configured to allow air flow into and out of the enclosure as well as to buffer the heat transfer to result in gradual heating of the front area of the enclosure. For example, if the heat lamp 100 is reset from 70 degrees to 90 degrees and the temperature change in the heat lamp occurs in thirty seconds, the resulting temperature increase in the enclosure takes more time (e.g., 120 seconds) due to the presence of the cover. In the depicted embodiment, an illuminator is provided rearward of the heat lamp above the enclosure. In the depicted embodiment the illuminator is a florescent lamp 102 with a reflective backing sheet 104 that reflects light towards the top of the enclosures supported on the tray 14. In the depicted embodiment the heat lamp 100 is a variable output lamp in that the lamp is configured to output heat faster when the gap between the target temperature and the actual temperature is larger and output heat slower when the gap between the target temperature and the actual temperature is smaller. For example, the heat lamp 100 could be an infrared heat lamp. In the depicted embodiment the actual temperature in the enclosure is approximated by with a temperature sensor 150 that measures the temperature at a location above the top of the enclosure adjacent the heat lamp 100.

As discussed above, the heat lamp 100 and the belly heat element 46 are located outside of the enclosure and configured to heat the front area of the enclosure. In the depicted embodiment, the heat lamp 100 and the belly heat element 46 are the only sources of heat that are configured to provide heat to the enclosure. In the depicted embodiment heat dissipates from the enclosure through the wall of the enclosure as well as via the air flow through the vents 86, 88 on the side walls of the enclosures. The heating system results in a temperature gradient within the enclosure.

Figure 8:
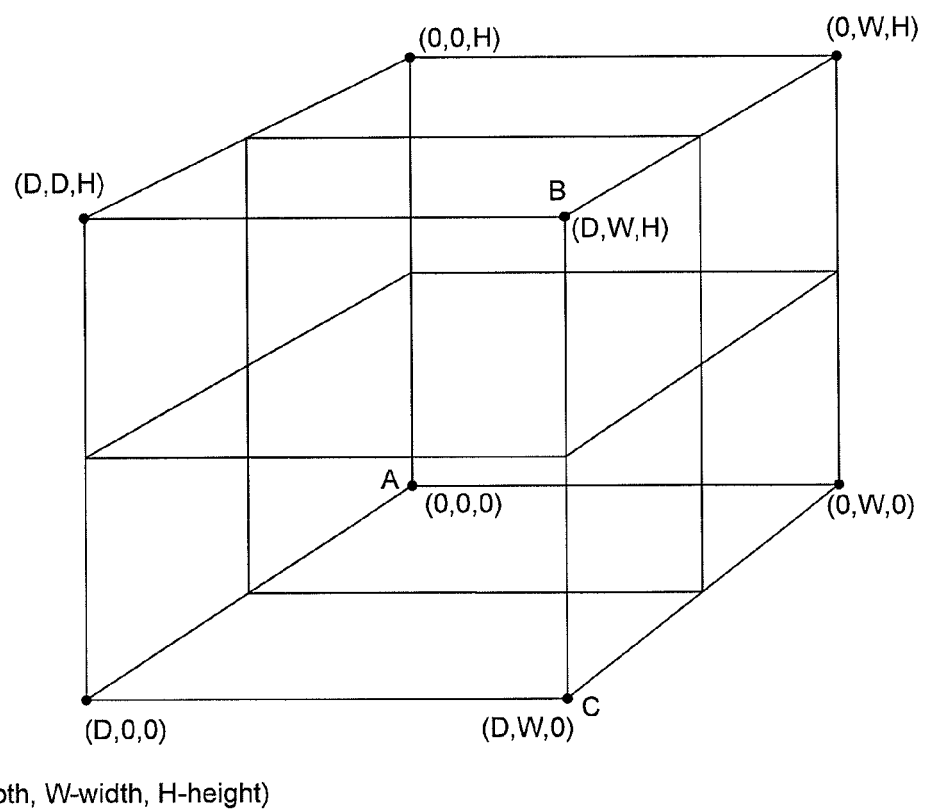
FIG. 8 is a 3D layout of the enclosure of FIG. 4.
Figure 9:
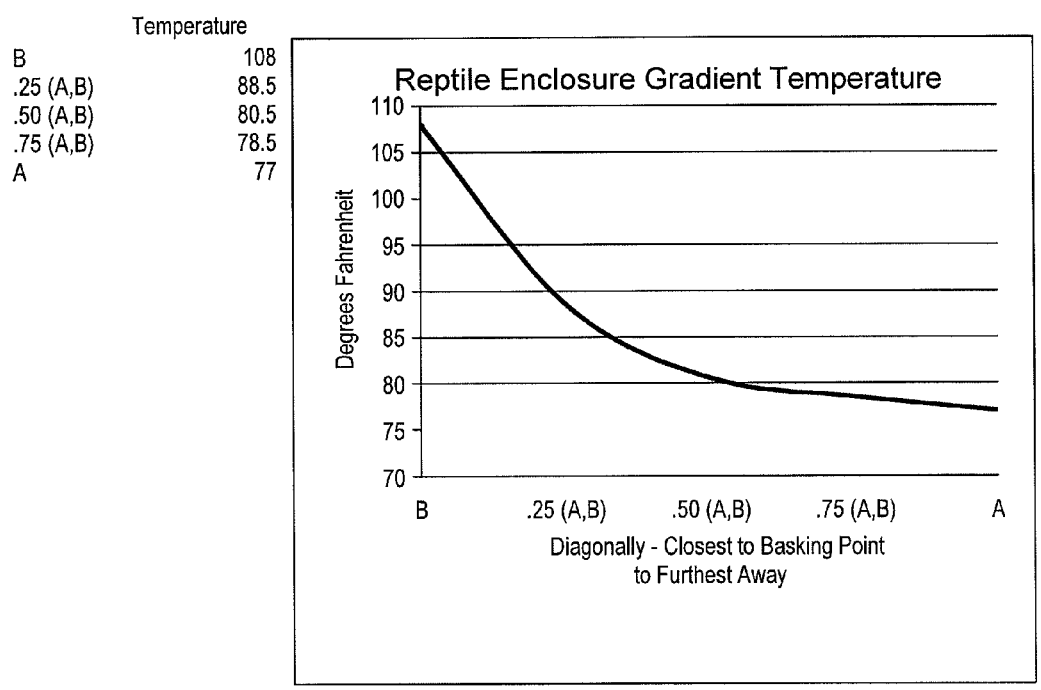
FIG. 9 is a graphical representation of the temperature gradient along a line extending between points A and B in FIG. 8.
Figure 10:
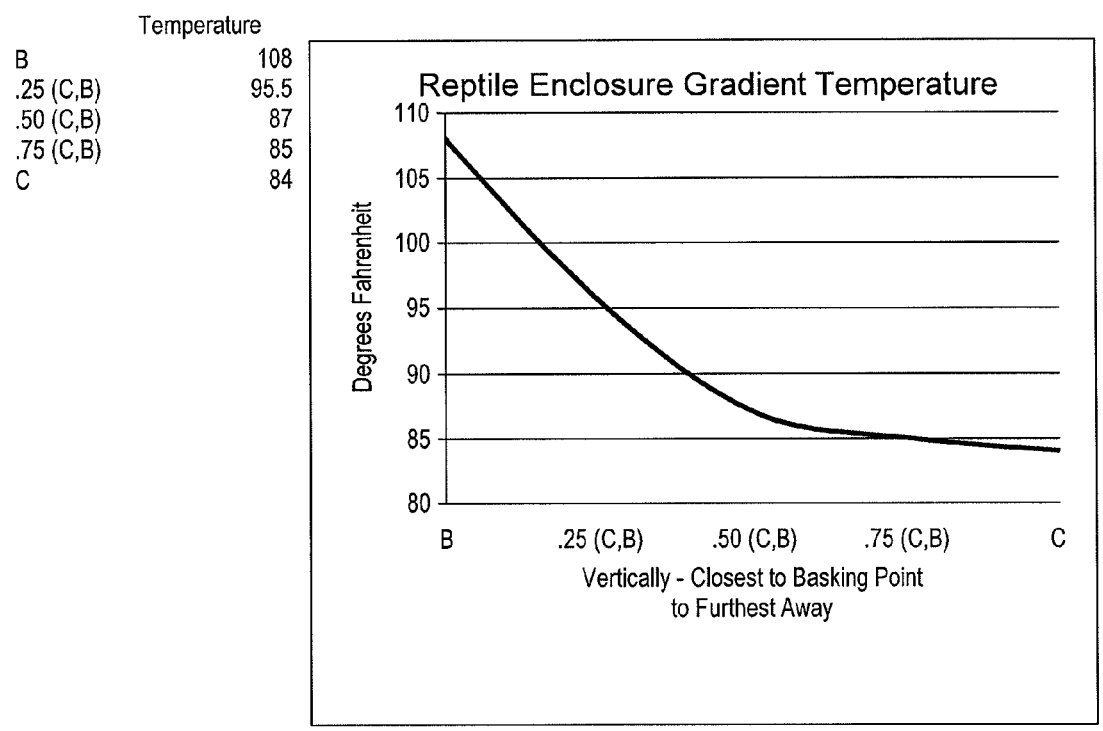
FIG. 10 is a graphical representation of the temperature gradient along a line extending between points B and C in FIG. 8.

Referring to FIGS. 8-10, the resulting temperature gradient is described in greater detail. FIG. 8 provides an illustration of the internal space within an enclosure. In the depicted embodiment the enclosure is rectangular having a height H, a width W, and a depth D. Point A is located at the lower back corner and defines the origin (point 0, 0, 0) of a Cartesian coordinate system projected over the internal space of the enclosure. Point B defines the upper front right corner of the space and has the coordinates (D, W, H). For example, if the depth is 1.5 feet, the width is 2.0 feet, and the height is 1.0 feet, point B is located at (1.5, 2.0, 1.0) relative to point A (0, 0, 0). Referring to FIG. 9, the temperature gradient along a line between points B-A is shown. The temperature at point B is 108 degrees Fahrenheit (42.2 degrees Celsius) and the temperature at point A is 77 degrees Fahrenheit (25.0 degrees Celsius). The drop off in temperature between points B to A is not linear. Note that at the halfway point between B to A the temperature is 80.5 degrees Fahrenheit (26.9 degrees Celsius). In the depicted embodiment 89% of the total temperature drop occurs at the front half of the distance between points B to A.

In the depicted embodiment point C (D, W, 0) defines a location that is in the same horizontal plane as point A and is directly below point B. See FIG. 8. FIG. 10 depicts the temperature gradient along a line between points B and C. FIG. 10 shows that the temperature within the enclosure drops off exponentially in the vertical direction. The temperature at point B is 108 degrees Fahrenheit (42.2 degrees Celsius), the temperature at point C is 84 degrees Fahrenheit (28.9 degrees Celsius), and the temperature half way between the B and C is 87 degrees Fahrenheit (30.6 degrees Celsius). The present disclosure provides a configuration wherein heat can be provide in a localized zone within the enclosure to create a temperature gradient within the enclosure. The localized temperature control is also beneficial in that the temperatures in adjacent enclosures can vary widely to adapt to the needs of the user.

Referring to FIGS. 5D-7B, the venting system is described in greater detail. In the depicted embodiment the venting system includes a plurality of ducts 110, 112, 114, 116 on a back plane 118 that are connected to a blower unit 120 via conduits 122, 124, 126, 128. The duct and back plane configuration works together to draw air from within the enclosure out. The enclosures are configured such that when they are arranged adjacent to each other a small gap 156, 158 is maintained between the side walls so that air can be drawn from the enclosure through the vents 86, 88. The gap is maintained as a result of corners of the enclosure protruding sidewardly. The enclosure is also configured so that air can be drawn from the enclosure through the perforated cover. Activating the blower unit 120 drops the pressure within the enclosure on the front side of the back plane 118 and draws air into the ducts 110, 112, 114, 116. In the depicted embodiment the air exits the venting system at the top of the enclosure through the exhaust vent 140.

Figure 7A:
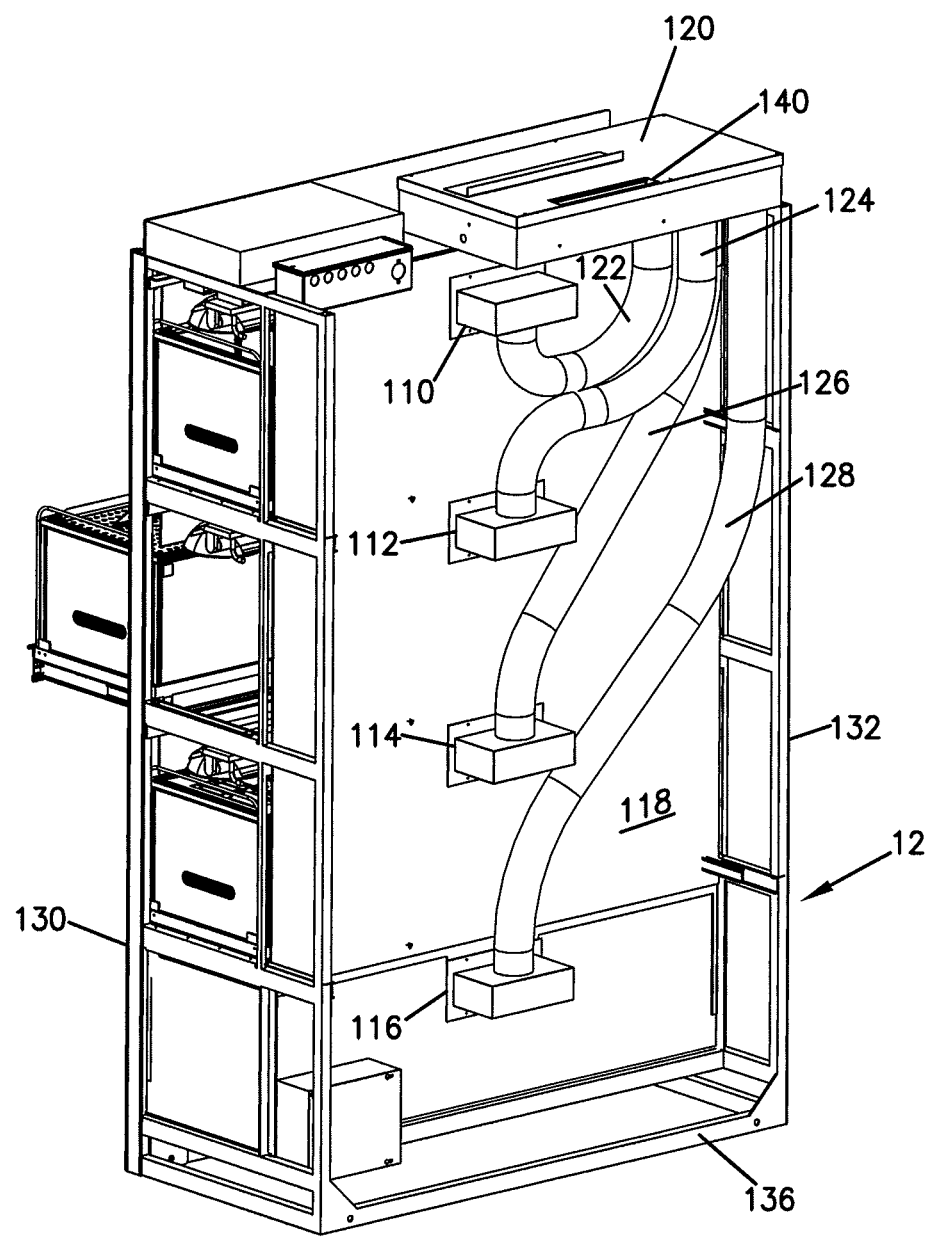
FIG. 7A is a rear perspective view of the enclosure system of FIG. 1 with exterior panels removed.
Figure 7B:
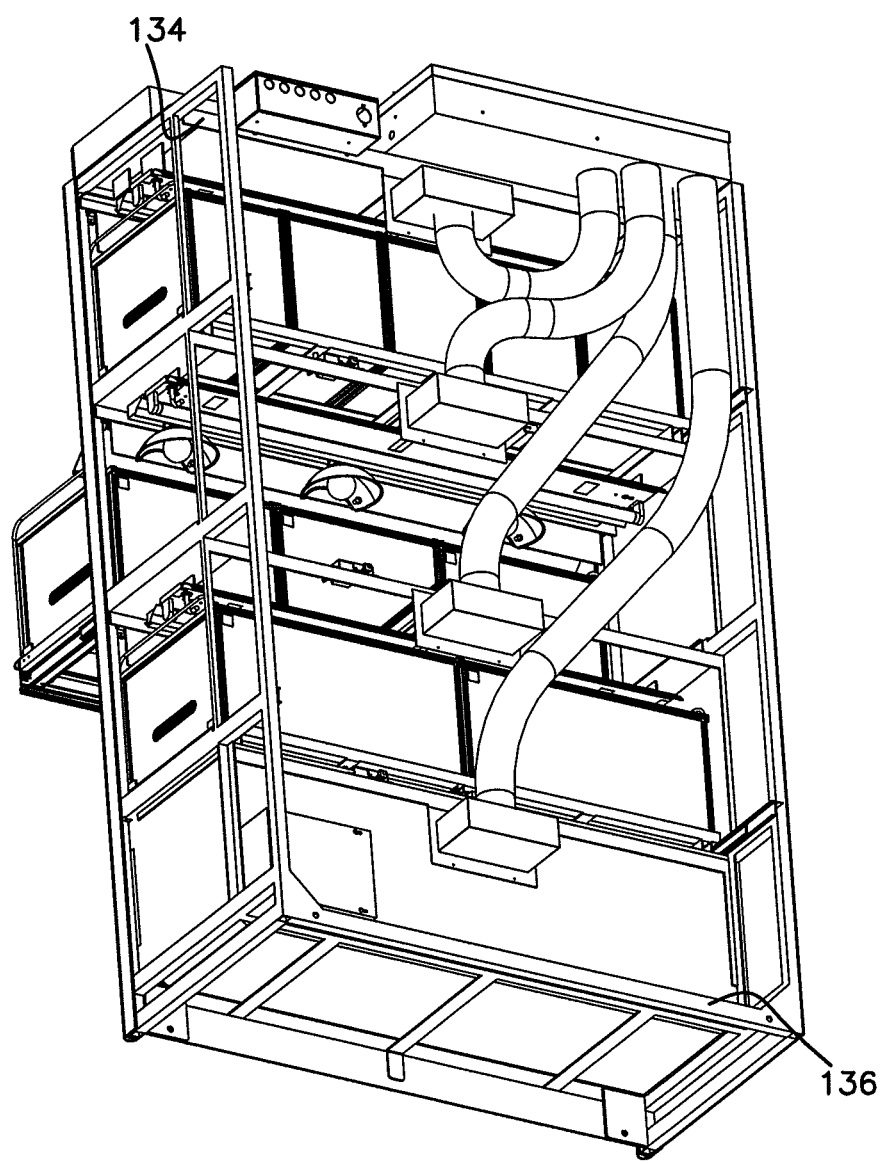
FIG. 7B is a rear perspective view of the enclosure system of FIG. 1 with exterior and some interior panels removed.

Referring to FIGS. 7A and 7B, the frame 12 is shown in further detail. In the depicted embodiment the frame includes opposed side support structures 130, 132, an upper support structure 134, and a lower support structure 136. The frame 12 supports the horizontally sliding trays 14 which support the modular enclosures. The frame also supports the external cladding (e.g., side walls 18, 20, the cladding on the front plane 16) and the back plane.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A multi-enclosure reptile display system comprising:
   a chassis;
   a plurality of trays slidably connected to the chassis and being configured and arranged to slide from a retracted position to an extended position relative to the chassis;
   a plurality of reptile enclosures supported on at least one of the plurality of trays, each reptile enclosure defining an enclosed area, the enclosed area comprising a front zone proximate a forward edge of the at least one of the plurality of trays and a rear zone proximate a rearward edge of the at least one of the plurality of trays;
   a light containment shield pivotally connected to the chassis and configured to automatically pivot to a first orientation when the tray is in an extended position and pivot to a second orientation when the tray is in a retracted position;
   a belly heating element provided on the at least one of the plurality of trays, the belly heating element positioned under the front zone of at least one of the plurality of reptile enclosures at least when the at least one of the plurality of trays is in the retracted position;
   a basking heating element fixed to the chassis and positioned adjacent to and rearward of the light containment shield and positioned over the front zone of the at least one of the plurality of reptile enclosures when the tray is in the retracted position,
   wherein the belly heating element and the basking heating element are configured and arranged such that they can generate a temperature gradient that decreases from the front zone towards the rear zone of the at least one of the plurality of reptile enclosures.

2. The multi-enclosure reptile display system of claim 1, wherein the basking heating element is an infrared heat lamp that is configured to output heat faster when a temperature gap between a target temperature and a measured temperature is larger and output heat slower when the temperature gap is smaller.

3. The multi-enclosure reptile display system of claim 2, wherein the infrared heat lamp is positioned within three centimeters from a top surface of the at least one of the reptile enclosures, wherein the top surface is perforated.

4. The multi-enclosure reptile display system of claim 3, further comprising a temperature sensor positioned above the top surface of the at least one of the reptile enclosures adjacent a side of the infrared heat lamp.

5. The multi-enclosure reptile display system of claim 2, further comprising an illuminator positioned over the at least one reptile enclosure rearward of the infrared heat source when the tray is in the retracted position.

6. The multi-enclosure reptile display system of claim 1, wherein the belly heating element extends across and directly contacts a bottom surface of at least two adjacent reptile enclosures of the plurality of reptile enclosures.

7. The multi-enclosure reptile display system of claim 1, wherein the at least one reptile enclosure includes a perforated top cover, a bottom surface, a transparent front surface, a back surface, and opaque side surfaces.

8. The multi-enclosure reptile display system of claim 7, wherein the bottom surface, the front surface, the back surface, and the opaque side surfaces are connected together via extruded joint members, the extruded joint members defining radiused inner facing transition surfaces.

9. The multi-enclosure reptile display system of claim 8, wherein the side surfaces include vents and the enclosures are constructed such that a vertical air gap is maintained between two adjacent reptile enclosures of the plurality of reptile enclosures even when the two adjacent reptile enclosures of the plurality of reptile enclosures are abutted next to each other.

10. The multi-enclosure reptile display system of claim 1, wherein the trays are slidably connected to the chassis at a first end, at a second end, and at a location between the first end and the second end.

11. The multi-enclosure reptile display system of claim 1, wherein the light containment shields is configured to pivot about a horizontal axis when the at least one of the plurality of trays is slid forward to the extended position to the first orientation wherein the light containment shield is in a non-vertical orientation.

12. The multi-enclosure reptile display system of claim 11, further comprising a pair of curved guide rods connected to opposed ends of the at least one of the plurality of trays for actuating a door.

* * * * *